Aug. 6, 1940.　　　G. H. JOHNSON　　　2,209,978
LID SUPPORT
Filed Aug. 5, 1936　　　2 Sheets-Sheet 1
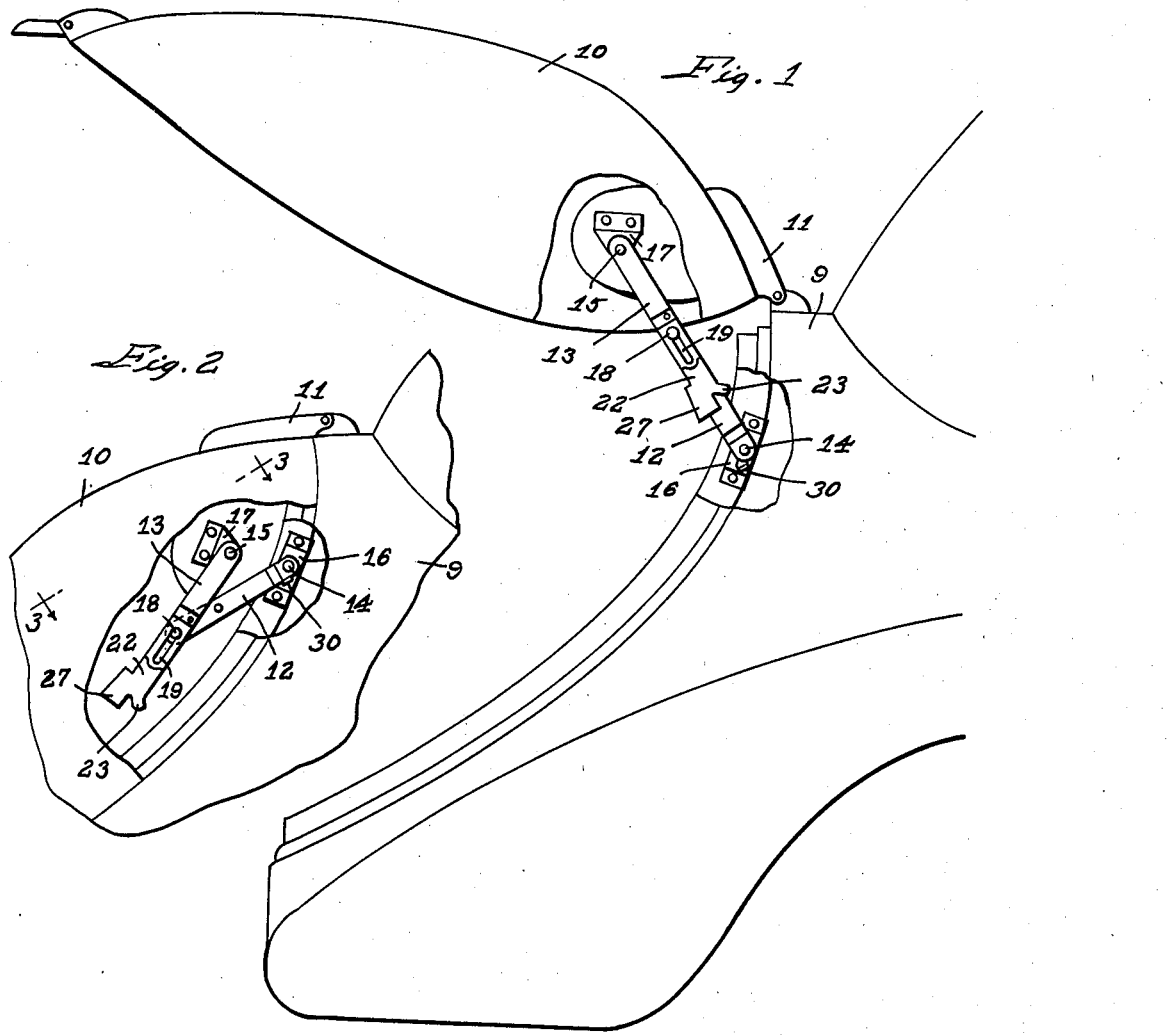
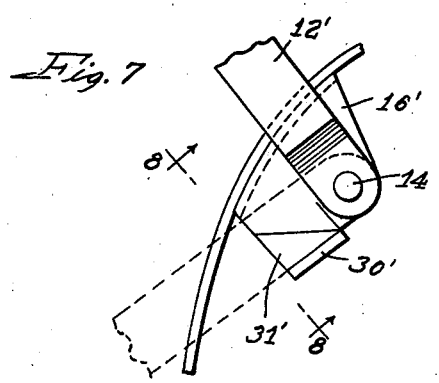
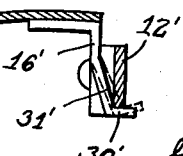
Inventor:
George H. Johnson
By Wilson, Dowell,
McCanna & Wintercorn
Attys.

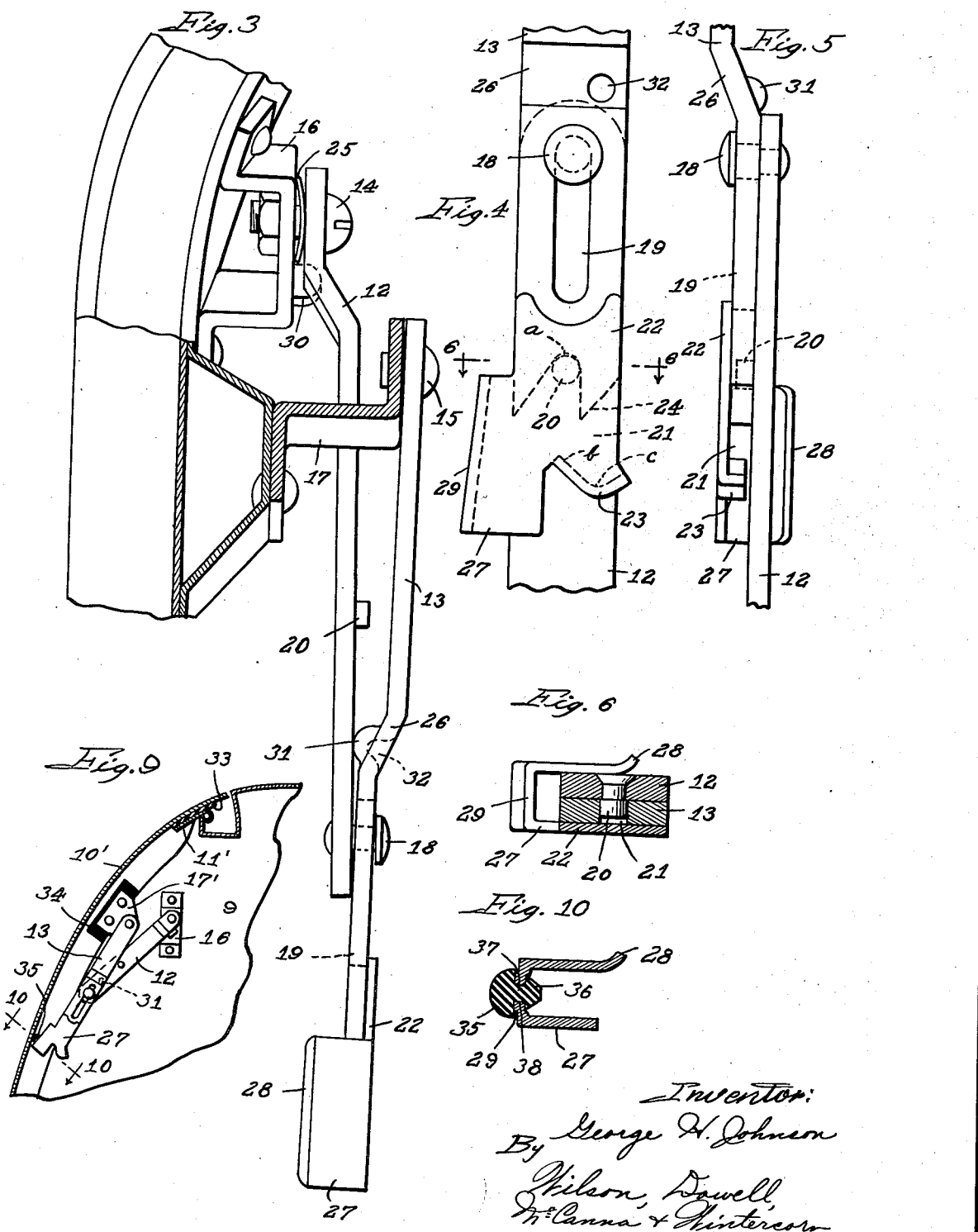

Patented Aug. 6, 1940

2,209,978

UNITED STATES PATENT OFFICE 2,209,978

LID SUPPORT

George H. Johnson, Rockford, Ill., assignor to The Atwood Vacuum Machine Company, Rockford, Ill., a co-partnership composed of Seth B. Atwood and James T. Atwood Application August 5, 1936, Serial No. 94,305

7 Claims. (Cl. 217—60)

This invention relates generally to supports for liftable hinged closures, and is more particularly concerned with a support for the lid of a luggage compartment on an automobile or other vehicle.

Supports similar to what have been used on phonograph cabinet lids have been found unsuitable for use on automobiles because of the danger involved of serious injury in the event the lid on a rear trunk or luggage compartment, for example, should fall accidentally while the motorist is putting in or removing articles from the compartment. The danger, of course, is greatly increased when such supports are used on heavier lids, as, for example, on the large engine hoods used on the streamline automobiles. It is, therefore, the principal object of my invention to provide a support having two pivotally connected arms pivotally attached to the body and lid at their remote ends and equipped with a special form of coacting pin and cam slot means at their pivotally connected ends for automatically locking the arms in supporting relation, whereby to insure the same safe degree of positive locking in each operation of the lid.

Certain earlier types of supports were objectionable from the standpoint that if play developed between the arms, there was too much danger of the pin becoming disengaged from the slot while the arms were in cocked supporting position, and thus allowing the lid to drop. In accordance with my invention, therefore, I provide a U-shaped yoke or fork on the end of one arm to receive the cooperating end of the other arm when the arms interengage to support the lid, thus permitting the support to be made with ample play in the parts for easy operation without incurring any danger of such accidental disengagement of the arms just mentioned.

It is also important in a device of this kind to avoid rattling and vibration of parts when the car is in motion, and with that object in view I have provided a simple and effective means which, in the folding of the arms as the lid is closed, places the arms under a definite restraint or stress by reason of what I term a "pinching" action occurring preferably between the two arms, or else between one of the arms and the body of the car, or the lid. In that way, the arms are held rigid in folded position, and cannot rattle.

The invention is illustrated in the accompanying drawings, in which—

Figure 1 is a side view of the rear portion of an automobile showing a support made in accordance with my invention applied to the luggage compartment lid, which is shown raised;

Fig. 2 shows the support in folded position with the lid closed;

Fig. 3 is a rear view of the support as it appears in Fig. 2, but on a larger scale, the view being taken approximately on the line 3—3 of Fig. 2;

Figs. 4 and 5 are two views from the side and front, respectively, of the interlocked ends of the supporting arms in cocked supporting position;

Fig. 6 is a sectional detail on the line 6—6 of Fig. 4;

Fig. 7 is a fragmentary detail showing a modification in one detail of the support;

Fig. 8 is a sectional detail on the line 8—8 of Fig. 7;

Fig. 9 is a sectional view somewhat similar to Fig. 2, illustrating another feature of the lid support, and Fig. 10 is a sectional detail of the bumper mounting taken on the line 10—10 of Fig. 9.

Similar reference numerals are applied to corresponding parts throughout the views.

Referring to Figs. 1 to 6, the reference numeral 9 designates the luggage compartment of an automobile, and 10 its lid or door hinged, as indicated at 11, to permit raising and lowering to and from the open position illustration in Fig. 1. The support of the present invention constitutes an improvement on that disclosed in my copending application Serial No. 35,559, filed August 10, 1935, and, like that support, comprises two supporting arms or links 12 and 13 pivotally attached at 14 and 15, respectively, to the side wall of the luggage compartment 9 and edge portion of the lid 10, as shown. Brackets 16 and 17 are riveted or otherwise suitably secured to the body and lid to provide the pivot supports. The arms 12 and 13, similarly as in the earlier application, have a pin and slot pivotal connection at their free ends, the headed pin 18 carried on the arm 12 being slidable in a slot 19 extending lengthwise of the outer end of the arm 13. A pin or stud 20 mounted on the arm 12 an inwardly spaced relation to the pin 18 is arranged to enter a cam slot 21 in the end of the arm 13 in outwardly spaced relation to the longitudinal slot 19. In keeping with the disclosure in the earlier application, a plate 22 is welded or otherwise suitably secured on the end of the arm 13 and has a flanged portion 23 which cooperates with the sawtooth flange 24 on the end of the arm 13 to form the cam slot 21. A spring washer 25 is compressed under the end of the arm 12 at the pivot 14 to provide frictional drag. The offset 26 in the arm 13, in inwardly spaced relation to the slot 19, permits the arm 12 to swing alongside the arm 13 in folding, without having the pin 20 strike the arm 13.

In operation, the arms 12 and 13 are folded, as shown in Fig. 2, when the lid 10 is closed. As the lid is raised, the arm 13, by reason of the frictional drag imposed upon the movement of the arm 12, first slides on the pin 18 to the extent permitted by the slot 19, and, when the pin 18 reaches the outer end of the slot, the arm 12 commences to swing about its pivot 14. The arms at the limit of upward movement of the lid are in endwise alignment with the pin 18 at the outer end of the slot 19 and the pin 20 adjacent the cam slot 21. Then, as the lid is lowered, the pin 20 enters the slot 21 and seats in the recess $a$ at the same time that the pin 18 reaches the far end of the slot 19, and the lid is therefore securely supported. In other words, the motorist simply raises the lid as far as it will go and then releases it, and when he does that the pins 18 and 20 move into the positions shown in Fig. 4, and no amount of ordinary jarring of the lid could possibly cause it to drop. There is no "hair trigger" action like there was with the old over-center type of lid support. The fact that both pins bottom at the same time is of advantage in distributing the load and reducing likelihood of the support becoming wobbly by reason of loosening of a supporting pin. The motorist furthermore does not have to touch the arms as with the old over-center type, and can therefore perform the operation with one hand, if desired. When the lid is to be lowered again, the motorist first raises it as far as it will go, and in this operation the pin 20 leaves the recess $a$ and rides on the cam surface $b$ into the recess $c$, thus limiting the raising of the lid and at the same time setting the arms 12 and 13 in readiness for folding. The motorist merely raises the lid as far as it will go and then lowers it, and, as the lid is lowered, the pin 20 leaves the slot 21, and the arms fold toward the relationship shown in Fig. 2. Throughout this cycle of operation, the frictional drag imposed upon the movement of the arm 12 by the washer 25 plays an important part in eliminating reliance upon gravity, which might otherwise under certain conditions, when the car is on an up-hill or down-hill grade, cause the arms to assume undesired positions at certain stages of the cycle. The drag assures the proper relationship of the arms at every point in the cycle of operation.

In accordance with the present invention, the plate 22 not only forms a part of the cam slot on the end of the arm 13 with its flange 23, but is bent to U-shape cross-section to provide a yoke or fork 27 in which the end of the other arm 12 is arranged to be received and be held in close abutment with the arm 13, as illustrated in Figs. 5 and 6, when the arms are in cocked supporting relation. In earlier lid supports, if play developed between the arms, the projection on the one arm relied upon for support by its engagement in a recess in the other arm was apt to become disengaged from the recess and thus allow the lid to drop. The yoke 27 keeps the arms 12 and 13 in snug engagement when they are in supporting relation, and there is no possibility, therefore, for the pin 20 to become disengaged from the slot 21. The present support is therefore absolutely safe. The construction furthermore permits ample allowance for clearance between the parts for easy operation, without incurring any danger of the support failing. The free end of the forked yoke portion 27 is bent outwardly, as indicated at 28, to provide a guide for the arm 12 to ride into the yoke as the arms come into endwise alignment in the raising of the lid 10. The transverse or bight portion 29 of the yoke is also arranged to serve as a limiting stop for the arm 12 when the arms swing into endwise alignment in the raising of the lid, and will guide the arm as the lid is lowered so that the pin 20 will ride up into the recess $a$. In other words, the arms cannot fold in the reverse direction from that illustrated in Fig. 2, because the yoke 27 serves as a stop for the arm 12, limiting movement over center to the extent where the pin 20 is assured of entering the recess $a$ as the lid is lowered from its extreme upper position. The support is therefore made foolproof, and no amount of rough handling of the lid can throw the arms into any relationship that would result in a jam and probable damage to the support, or lid, or both.

It will now be observed that the bracket 16 has a small lug 30 projecting therefrom below the pivot 14, arranged to limit the downward swing of the arm 12 as the arms fold in the closing of the lid 10. See Fig. 2. This is of distinct advantage, because the position of the folded support is thereby definitely predetermined, and there is no danger of the support protruding into the luggage compartment and causing damage to luggage placed therein. Since the relationship of the arms when folded is definitely predetermined, there is no danger of the arm 12 getting into a position where it will swing in a counterclockwise direction about its pivot, instead of in a clockwise direction. A still further advantage of the limiting stop 30 is that it provides rigid support for the arm 12 so that a knob 31 can be provided on the arm 13 to wedgingly engage the arm 12 as the arms fold into the position shown in Figs. 2 and 3, whereby to exert a pinching or crowding action between the arms, and flex them slightly so that the assembly binds at the pivots 14, 15 and 18, and cannot therefore develop a rattle when the car is in motion. The knob 31 is preferably formed as an integral part of the arm 13 on the offset portion 26 by extrusion between dies, as indicated by the dimple 32 formed on the opposite side of the arm from the knob. Therefore, even though ample clearance is provided between the parts to assure easy operation, rattling of the assembly is prevented when the car is in motion. The knob 31 is inwardly spaced from the end of the slot 19 sufficiently to clear the end of the arm 12 when the arms are in coextensive supporting relationship, as appears in Figs. 4 and 5. It will not, therefore, interfere in any way with the functioning of the support, but comes into play only when the arms fold in the closing of the lid.

Now, referring to Figs. 7 and 8, a stop 30' is shown on a bracket 16' for cooperation with the arm 12' to limit counterclockwise swinging movement thereof in the folding of the arms similarly as the lug 30 previously described. However, in this case, an inclined surface 31' is provided on the bracket 16' for wedging engagement by the arm as it approaches the stop 30', whereby to place the entire support assembly under a stress or strain somewhat similar to what is secured with the knob 31 in the construction previously described. In that way, rattling of the parts when the car is in motion is also prevented.

In Fig. 9, the lid 10' for the luggage compartment 9' is shown as hinged at 11', and insulated from the body of the car, as indicated by the insulation 33 at the hinges 11'. By insulating the lid from the body, the lid can be used as an aerial for the car's radio. The lid support has the bracket 17' thereof also insulated from the lid, as indicated at 34. Now, in accordance with my invention, I provide a rubber bumper 35 on the yoke 27, arranged to be engaged by the lid 10' in the closing of the lid, whereby to force the knob 31 into wedging engagement with the arm 12 to secure the binding action between the arms 12 and 13, previously mentioned. If no arrangement were made for positively forcing the arms 12 and 13 together, the knob 31 might in certain cases not engage the arm 12 at all, or at least not sufficiently to really give a binding action between the arms, and prevent rattling of the lid support when the car is in motion. The provision whereby the arm 13 is forced toward the arm 12 by the lid itself, insures such binding action and eliminates the necessity for close accuracy in the location of the brackets 16' and 17'. The bumper 35 silences this operation and prevents rattling of the support against the lid when the car is in motion, besides keeping the lid support insulated from the lid, whereby to keep the lid insulated from the body of the car to which the lid support is attached and grounded at 16. I have previously pointed out how the transverse or bight portion 29 of the yoke portion 27 is arranged to serve as a limiting stop for the arm 12 when the arms swing into endwise alignment in the raising of the lid. That occurs when the lid is raised quickly, when the arms 12 and 13 swing past a dead center under their own momentum. Now, under those conditions, the small retaining head 36 on the shank 37 of the bumper 35 will afford a bumper for engagement by the arm 12 to prevent metal to metal contact, and thus silence the operation. As clearly appears in Fig. 10, the head 36 is tapered so as to permit of its being forced through the hole 38 in the bight portion 29 of the yoke 27. The bumper 35 therefore serves a three-fold purpose: As an insulator between the lid 10' and the lid support 12—13; as a bumper for silencing the engagement of the lid with the lid support in closing and thereafter, and as a bumper for silencing the engagement between the arms 12 and 13 when swung into co-extended relation.

It is believed the foregoing description conveys a good understanding of the objects and advantages of my invention. The appended claims have been drawn with a view to covering all legitimate modifications and adaptations.

I claim:

1. A lid support comprising a first arm pivotally attached to a lid, a second arm pivotally attached to a receptacle, said first arm having a free end portion bent into offset but parallel relation to the rest of the arm, the offset end portion having a slot provided therein and the extremity thereof having a notch provided therein; a first pin on the free end of the second arm operating in the slot and thereby pivotally and slidably connecting the free ends of said arms, a second pin on the second arm in longitudinally spaced relation to the first pin arranged to enter the notch when the arms are in supporting relation, and a plate carried on the outer side of the notched end of the first arm having an inwardly bent lower edge portion defining cam surfaces in angular relation to one another and in spaced relation to the notched end of the arm for engagement by the second pin on the second arm to guide the same out of engagement with the first arm upon relative endwise movement between said arms from lid-supporting position, and said plate having a longitudinal edge portion bent inwardly to form a channel to receive the edge portion of the second arm in lid-supporting position, substantially as and for the purpose described.

2. A lid support as set forth in claim 1, wherein the last named plate has an opening provided therein in the transverse wall of the channel-shaped portion thereof, the lid support including a rubber bumper button having a headed shank portion entered in said opening from the outside of the channel-shaped portion, substantially as and for the purpose described.

3. A lid support comprising two arms, one adapted to be pivoted to a lid and the other adapted to be pivoted to a receptacle, a slot provided in the free end of one arm and a pin on the free end of the other arm entered therein to pivotally and slidably connect said arms, said arms being thereby pivoted so as to be foldable into overlapping relation, the free end of the slotted arm also having a notch provided therein, and another pin on the other arm spaced from its free end arranged to engage in the notch to hold the arms rigidly in supporting relation, the slotted arm having the pivoted end portion thereof disposed in offset substantially parallel relation to the slotted free end portion of the arm and connected thereto by an intermediate angular portion, and said angular portion having a lateral projection of sufficient length to have sliding wedging engagement with the inner face of the other arm in the folding of the arms so as to cause a binding of the first pin in the slot, for the purpose described.

4. A lid support as set forth in claim 3, including a bracket for pivotally mounting one of the arms, said bracket having a stop projection thereon for limiting the folding movement of the arm, whereby in the relative movement of the arms in folding the stopped arm is supported for the wedging and binding action referred to.

5. A lid support comprising two arms, one adapted to be pivoted to a lid and the other adapted to be pivoted to a receptacle, a slot provided in the free end of one arm and a pin on the free end of the other arm entered therein to pivotally and slidably connect said arms, said arms being thereby pivoted so as to be foldable into overlapping relation, the free end of the slotted arm also having a notch provided therein, and another pin on the other arm spaced from its free end arranged to engage in the notch to hold the arms rigidly in supporting relation, the slotted arm having the pivoted end portion thereof disposed in offset substantially parallel relation to the slotted free end portion of the arm and connected thereto by an intermediate angular portion, and one of said arms having a lateral projection thereon which in the folded relationship of the arms extends from its associated arm toward and engages the adjacent inner face of the other arm, said projection being of sufficient length in relation to the spacing of the offset portion of the slotted arm relative to the other arm in the folded relationship of the arms to have sliding wedging engagement with the adjacent inner face of the other arm in the folding of the arms so as to cause a binding of the first pin in the slot, for the purpose described.

6. A lid support as set forth in claim 5, including a bracket for pivotally mounting one of the arms, said bracket having a stop projection thereon for limiting the folding movement of the arm, whereby in the relative movement of the arms in folding the stopped arm is supported for the wedging and binding action referred to.

7. A lid support comprising two arms, one adapted to be pivoted to a lid and the other adapted to be pivoted to a receptacle, a slot provided in the free end of one arm and a pin on the free end of the other arm entered therein to pivotally and slidably connect said arms, said arms being thereby pivoted so as to be foldable into overlapping relation, the free end of the slotted arm also having a notch provided therein, and another pin on the other arm spaced from its free end arranged to engage in the notch to hold the arms rigidly in supporting relation, said slotted arm having a channel-shaped extension on the free notched end thereof arranged to receive an adjacent longitudinal edge portion of the other arm when the arms are in lid supporting relationship, said channel-shaped extension having an opening provided therein in the transverse wall of the channel thereof, and a rubber bumper button having a headed shank portion entered in said opening from the outside of said channel-shaped extension, substantially as and for the purpose described.

GEORGE H. JOHNSON.